ROTARY ENGINE
Filed Oct. 13, 1964 3 Sheets-Sheet 1
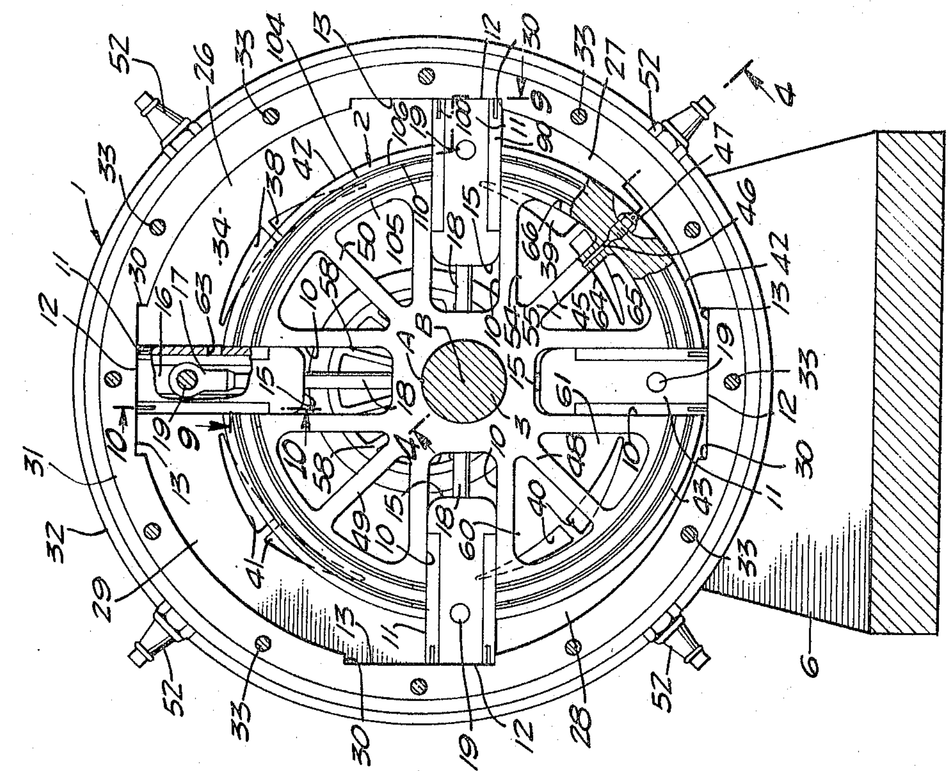
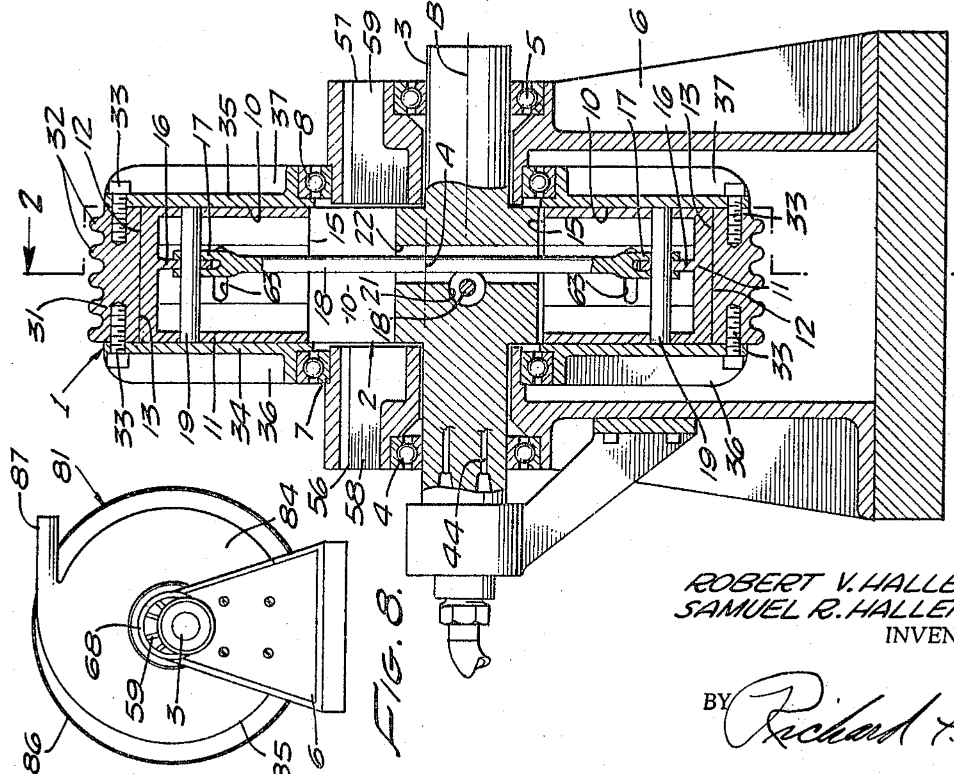
ROBERT V. HALLENBECK
SAMUEL R. HALLENBECK
INVENTORS
BY Richard F. Carr
ATTORNEY

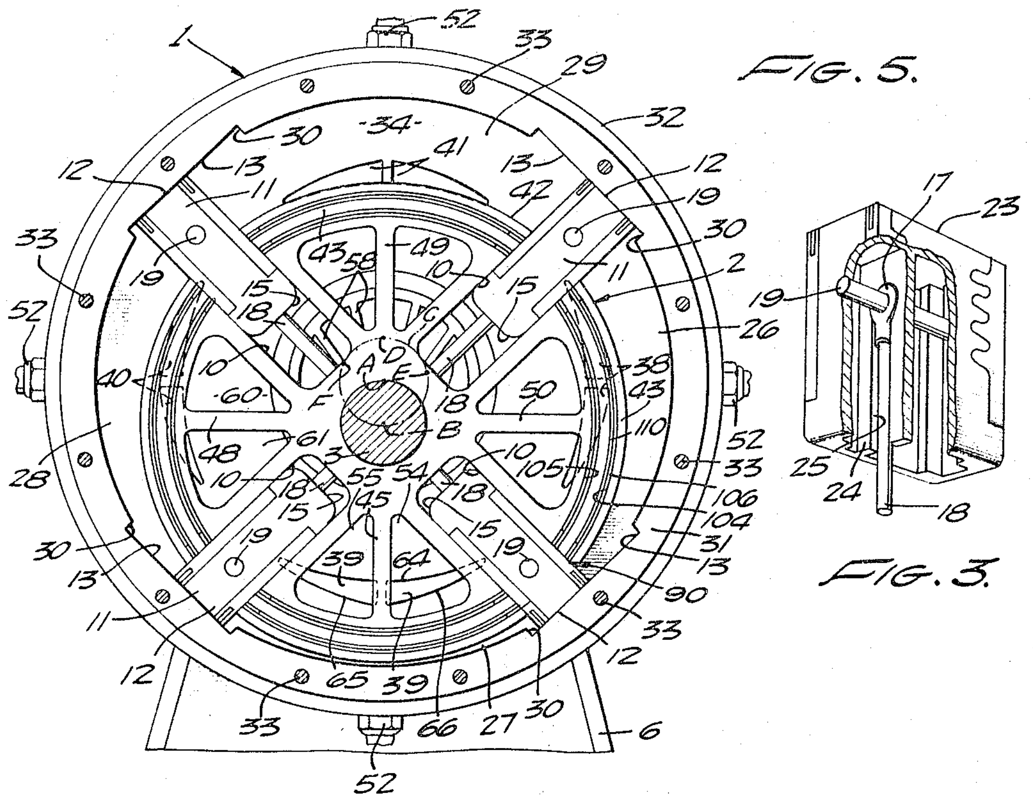
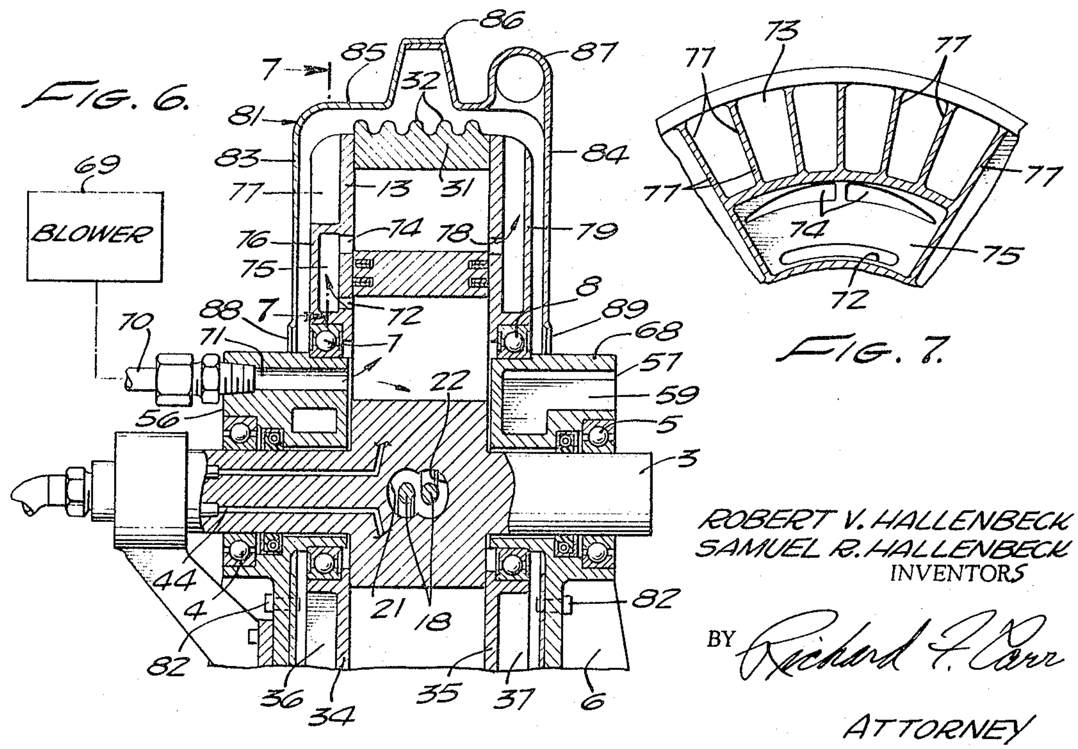
ROBERT V. HALLENBECK
SAMUEL R. HALLENBECK
INVENTORS
BY Richard F. Carr
ATTORNEY ROTARY ENGINE
Filed Oct. 13, 1964 3 Sheets-Sheet 3
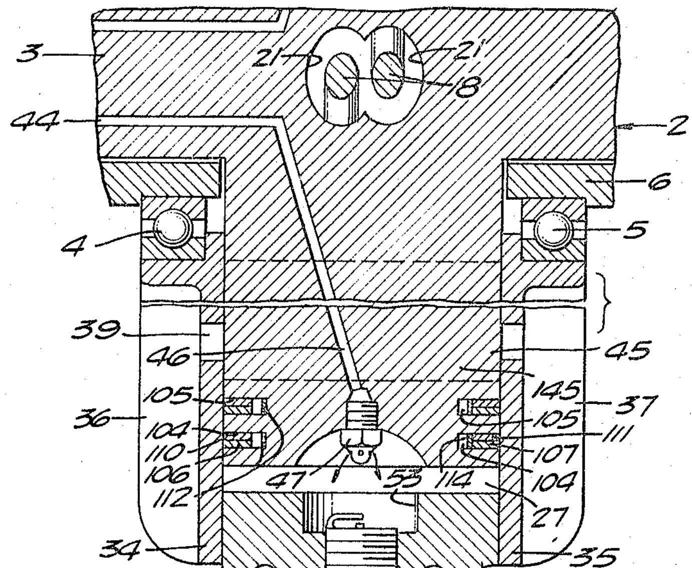
FIG. 4.
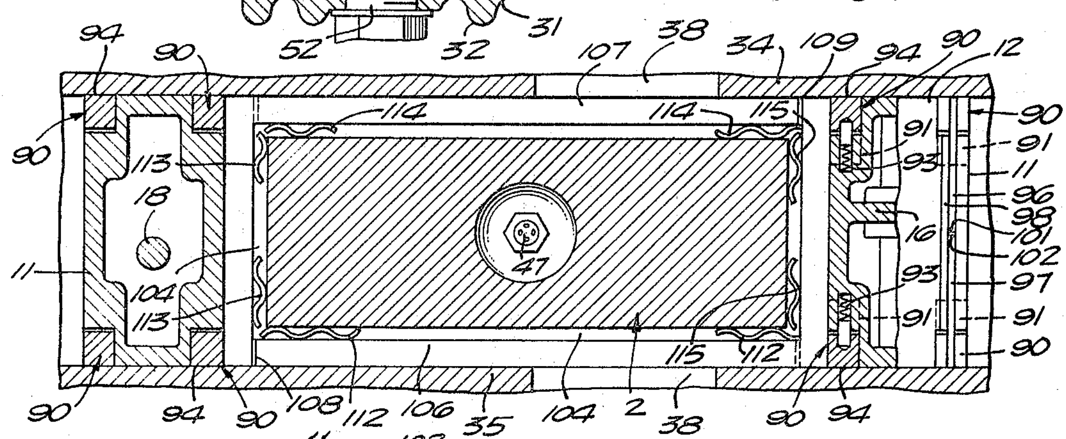
FIG. 9.
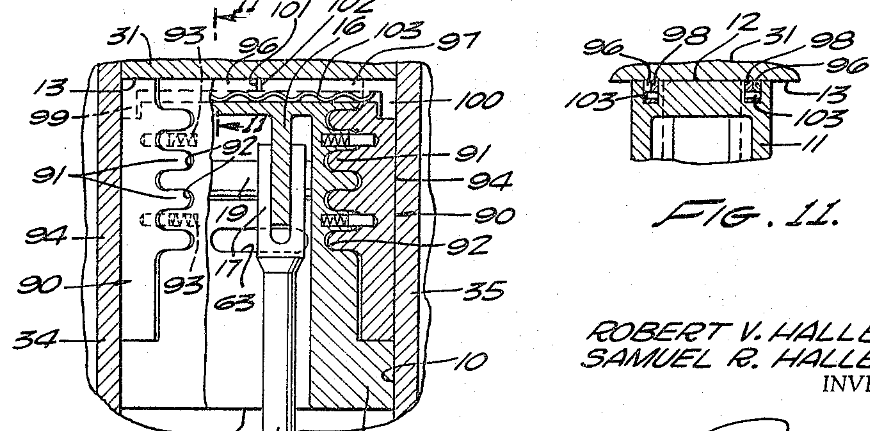
FIG. 10.
FIG. 11.
ROBERT V. HALLENBECK
SAMUEL R. HALLENBECK
INVENTORS
BY Richard F. Carr
ATTORNEY United States Patent Office 3,318,291

Patented May 9, 1967

3,318,291

ROTARY ENGINE

Robert V. Hallenbeck, Vancouver, British Columbia, Canada (5563 S. 178th St., Seattle, Wash. 98188), and Samuel R. Hallenbeck, Vancouver, British Columbia, Canada (1101 SW. Dakota, Seattle, Wash. 98106)

Filed Oct. 13, 1964, Ser. No. 405,331

7 Claims. (Cl. 123—8)

This invention pertains to an internal combustion engine of the rotary type that avoids the use of pistons, crankshaft and similar parts.

It has long been recognized that rotary engines could offer attractive possibilities in the prime mover field. Reciprocating engines inherently are inefficient as a result of the stopping and starting of the parts that move back and forth. Inertia must be overcome in each instance in order to cause the necessary movement of the parts. Also, the conventional reciprocating engine is a complicated device incorporating a vast number of moving parts and necessitating valves, cams, carburetors, ignition system and various other associated elements. Furthermore, such engines cannot be made vibration-free in their operation.

The present invention provides an improved rotary engine avoiding the above-enumerated difficulties and others encountered with reciprocating engines. This is accomplished through the provision of two rotating elements having offset parallel axes. One is positioned within the other and includes vanes which extend to flat surfaces on the inner periphery of the outer cage element. Oppositely positioned vanes are interconnected by rigid members. Unique spring-loaded blade seals are carried by the vanes and preclude appreciable leakage past these members. In addition, special seals of the same general type are mounted in the inner rotating element to bear against the radial side walls of the outer cage. These side walls include ports that serve several functions. They provide for the scavenging of the combustion chamber following the expansion of the ignited gases. The ports also allow for the intake of a fresh charge of air. The same ports give cooling to the interior of the engine as the ignition takes place. Fuel may be injected into the combustion chamber for actuating the engine, and it may be ignited either by a spark plug or by a glow plug. Compression ignition also is possible.

Accordingly, it is an object of this invention to provide an internal combustion engine of efficient and vibration-free operation, yet simple and economical to construct.

Another object of this invention is to provide a rotary engine having improved porting and cooling arrangements.

A further object of this invention is to provide a rotary engine having a minimum number of moving parts.

An additional object of this invention is to provide a rotary engine having efficient sealing provisions to preclude leakage past the relatively moving portions of the device.

These and other objects will become apparent from the following detailed description taken in connection with the accompanying drawing in which:

FIGURE 1 is an axial sectional view of the device of this invention;

FIGURE 2 is a transverse sectional view of the invention, taken along line 2—2 of FIGURE 1;

FIGURE 3 is a fragmentary perspective view, partially broken away, of a modified vane construction;

FIGURE 4 is an enlarged fragmentary sectional view, taken along line 4—4 of FIGURE 2, illustrating the fuel injection arrangement as well as other details of the engine;

FIGURE 5 is a transverse sectional view of the engine similar to FIGURE 2 but with the engine advanced rotationally 45° from the position of that view;

FIGURE 6 is a fragmentary axial sectional view of the engine modified to receive a pressurized air supply;

FIGURE 7 is a fragmentary sectional view taken along line 7—7 of FIGURE 6 showing the passageway for bypassing air around the rim of the inner rotor;

FIGURE 8 is an end elevational view on a reduced scale of the exterior of the engine illustrating the exhaust shroud;

FIGURE 9 is an enlarged sectional view, taken along line 9—9 of FIGURE 2, with the section being taken upon the curvilinear line between vane elements, illustrating the seals used for the inner rotating member and also for the vane elements;

FIGURE 10 is an enlarged fragmentary sectional view, taken along line 10—10 of FIGURE 2, giving further illustration of the seal for the vane; and FIGURE 11 is a fragmentary sectional view, taken along line 11—11 of FIGURE 10, showing the side-by-side mounting of the blade seals at the outer surfaces of the vanes.

With reference to the drawing, the general configuration of the engine of this invention may be seen by reference to FIGURES 1 and 2. The engine includes a hollow housing or cage assembly 1 within which is positioned a block assembly 2. The latter unit may include a shaft 3 mounted in spaced bearings 4 and 5. These bearings, in turn, are carried by an appropriate support base 6, which may be of the design illustrated or other form as desired.

The base 6 also rotatably mounts the cage assembly 1 in bearings 7 and 8. The latter bearings have their axes in spaced parallelism with the shaft 3 so that the cage assembly 1 is rotatable about a different axis A from the axis B of the block 2.

Formed in the block 2 is a plurality of slots 10. These slots preferably are positioned radially with respect to the axis of shaft 3 and extend the full axial length of the block. In the embodiment shown, four such slots are used, although there may be different quantities in other versions. Within each of these slots 10 there is slidably mounted a vane 11. These vanes also extend the length of the block 2. The vanes have flat outer walls 12 that slidably contact flat chordal surfaces 13 on the inner periphery of the circumferential wall of the cage assembly 1. Each vane is hollow and open at its inner end 15. A tab 16 extends inwardly from the outer wall 12 of the vane. The tab fits within bifurcated ends 17 of rods 18 extending between opposite vanes. Each tab and end 17 is apertured to receive a pin 19 that secures the rod to the vane. Thus, the vanes are arranged in opposed pairs rigidly spaced radially by means of the rod 18. In effect, the opposed pairs of vanes act as a single diametrically arranged element reciprocatively carried by the inner rotor 2.

Two rods 18 are provided in the version of the invention illustrated wherein four vanes are utilized. The rods are offset with respect to the centers of the vanes so that they clear each other and cause no interference. Openings 21 and 22 extend through the central portion of the block unit 2 to allow passage of the rods 18.

The engine of this invention is constructed to provide for a maximum amount of interchangeability, avoiding the necessity of tooling for special parts. Even though the rods 18 are spaced from each other, all of the vanes 11 may be identical. This arises from the positioning of the tabs 16 which are to one side of the center of each vane. The vanes are symmetrical so that by merely rotating them 180° they may be used for either the left hand or the right-hand rod 18.

A modified form of the vane and rod construction may be seen in FIGURE 3. This design prevents any rocking of the vane about the pin connecting it to the rod so that smooth movement along the chordal surface 13 of the cage unit is assured. The vane 23 shown includes an elongated intermediate wall 24 extending parallel to and the length of its side walls. The wall 24 is provided with a slot 25 that is adapted to receive the rod 18 that interconnects the opposite vanes. In assembly, the rod is inserted into the vane alongside wall 24, engaged with the pin 19 and then moved axially of the pin to enter the slot 25. The walls of the slot 25 prevent rotative movement of the rod relative to the vane so that the vane will not tend to rock on the flat surface 13. The description hereinafter refers to the vane 11, but it should be borne in mind that the design of FIGURE 3 is interchangeable with it.

The housing assembly 1, the block assembly 2, and the vanes 11 provide four separate chambers 26, 27, 28 and 29. As the elements 1 and 2 rotate together, these chambers change in volume, being reduced as the lower portion of the unit is reached. As the rotation of the engine takes place, the vanes 11 are caused to move with respect to the slots 10 which act as guide passageways in the block 1. This is between the fully retracted position at the bottom of the unit, as seen in FIGURES 1 and 2, and the extended portion at the upper end of the engine as shown in these views. Hence, while one vane is forced within the block by the surface 13 of the cage assembly, the other is advanced outwardly by the rod 18.

Also, the vanes make a small amount of movement relative to the unit 1 along the surfaces 13. As shown in FIGURE 1, it can be seen that the right-hand vane 11 is at the forward edge 30 of its surface 13, while the bottom and top vanes are centered with respect to the flat surfaces they contact. The left-hand vane has moved to the trailing edge of the corresponding surface 13. The fact that surfaces 13 are flat and perpendicular to the slots 10 permits the vanes to make this lateral movement along surfaces 13, yet be rigidly spaced in the radial direction.

The block 2 is coupled to the cage 1 through the vanes that interconnect these elements. For clockwise rotation the rotary connection results from the engagement of the vane 11 with the shoulder 30 at the leading edge of surface 13. Therefore, in FIGURE 2 the rotating parts are coupled by the right-hand vane 11.

The cage assembly 1 may be made up of three major parts, including an annular member 31 having the aforementioned flat surfaces 13 and provided with fins 32 around the periphery to enhance cooling. Screws 33 secure side plates 34 and 35 to the member 31, these side plates having inner walls perpendicular to the axes of rotation of the unit. Cooling fins 36 and 37 may be formed on the exterior of the plates 34 and 35.

The plates 34 and 35 may be made substantially identical and in some instances interchangeable. As shown in FIGURE 2, the plate 34 includes four ports 38, 39, 40 and 41. These ports are spaced about a common circumference concentric with the axis of rotation A of the unit 1. They are in a spaced relationship with each other, and essentially located at 45° with respect to a vertical line that would extend between the two axes of rotation when the unit is positioned as illustrated in FIGURE 2. Similar ports will be included in the opposite side plate 35.

These ports serve multiple functions. It can be seen in FIGURE 2 that the upper right-hand port 38 is partially positioned above the outer peripheral surface 42 of the rim 43 of block 2. As such, the port 38 serves as an intake opening, permitting a charge of air to be drawn into the chamber 26.

Chamber 27 at the lower right-hand portion of FIGURE 2 represents a further advanced rotational position in the cycle of the engine where the parts turn clockwise. The offset relationship between the cage 1 and the block 2 causes the port (in this instance port 39) to move radially inward with respect to the outer surface 42 of the peripheral rim of the block 2. This cuts off communication between the port and the chamber between the block and the cage. Also, as the rotation takes place, the offset relationship causes the chamber to reduce in volume so that it occupies the relatively small space of chamber 27 in the lower right-hand portion of FIGURE 2. This compresses the air within this chamber.

Approximately at this point fuel may be injected into the chamber for ignition. As shown in FIGURE 4, fuel is brought inwardly through longitudinal passageway 44 in shaft 3 and out through web 45 in angled passageway 46. A nozzle 47 is recessed beneath the surface 42 and serves to spray the fuel outwardly into the chamber between the elements 1 and 2. Of course, there are four such nozzles, the other three being positioned outwardly of the webs 48, 49 and 50.

The annular member 31 carries the means for exploding the mixture within the chamber into which the fuel is injected. This may be spark plug 52, the electrodes of which are within a recess 53 in the inner wall of the element 31. Alternatively, other igniting means such as a glow plug could be used. The engine also may be operated by compression ignition.

Full compression of the charge in chamber 27 is illustrated in FIGURE 5. This view shows the engine rotated 45° from the position of FIGURE 2. Upon injection of fuel and ignition approximately at this angular position an explosion will take place within the chamber 27. The force of this explosion can be dissipated only by causing the chamber 27 to expand in volume. The latter may occur solely by rotation of the unit so that the chamber 27 can become larger. Thus, the gases within chamber 27 upon ignition cause the unit to rotate.

The port 39, which in a previous rotational position had introduced a charge of air into the chamber 26, now is used for cooling. The block 2 is made hollow so that the port 39 enters into open areas 54 and 55 on either side of the web 45. This air may be brought into the interior of the unit through the open ends 56 and 57 of the support stand 6. These ends include webs 58 and 59 to permit structural support to be given bearings 7 and 8, but otherwise allow free air flow into the center of block 2. Hence, as the ports are closed and no longer allow air to flow into the combustion chamber, they take on a second function of cooling the inner wall of the block member at the time when the high heat of combustion is encountered.

As the unit continues its rotation following the ignition at the position of chamber 27, the expansion of the exploded gases begins to take place. This portion of the cycle is seen for chamber 28 in FIGURES 2 and 5. Protective cooling continues through the port (port 40 in this instance) located radially inward of the outer rim of the block 1. Thus, as shown for chamber 28, the port 40 allows cooling air to enter the zones 60 and 61 inward of the chamber 28.

Upon further rotation of the engine, the expansion becomes substantially complete. As this happens, the ports pass from their position beneath the periphery of the block 1 and emerge above the surface 42 to communicate with the combustion chamber. This has occurred for the chamber 29 of FIGURE 2. It can be seen that port 40 now extends above the surface 42 of the block to provide an opening into the chamber 29. At this time the port serves to exhaust the spent gases from within the chamber. Additionally, it permits a flow of air through the chamber to scavenge the gases and to give the chamber a fresh charge. This completes the cycle for the engine. In 360° of rotation, air is drawn in, compressed, ignited with fuel, the gases are expanded, and the combustion chamber is scavenged. During this time the ports in the walls 34 and 35 serve all the functions of cooling, exhausting, scavenging and intake for the cycle of the engine.

Cooling of the vanes, and to some extent scavenging of the combustion chambers, results from an additional flow passage through the vanes 11. This air can enter the vanes through openings 56 and 57 in the base 6 that lead to the interior of the block 2 and to the inner ends of the slots 10. Therefore, air enters the slots 10 and passes into the hollow interiors of the vanes. It can flow outwardly only through slots 63 in the front and rear surfaces of the vanes. The slots 63 are positioned so that they communicate with the combustion chambers only when the vanes are extended their maximum stroke from the slots 10. Hence, the openings 63 are closed during the times of compression, ignition and expansion within the engine.

If maximum effectiveness of the ports in the side walls 34 and 35 is to be realized, some care must be taken in contouring and positioning the edges of these ports. It is desirable to have the ports open rapidly for scavenging and intake, and to close with equal speed when compression is to be initiated. Also, the ports should achieve a full open position during the rotational cycle to permit a maximum amount of air to pass into the combustion chamber In the embodiment illustrated, these results are achieved by describing the top and bottom edges of the ports by circular arcs having the same radius as the circumference 42 of the cylinder block 2. All the edges have the same radius but they are struck from different center points to achieve the desired effect.

In FIGURE 5, the center points for the lowermost port 39 have been indicated. The other ports are similarly formed, but the centers for port 39 have been shown because they can be observed more readily. The center points for the various portions of this port, and the other four ports as well, fall along the circle C having as its center the axis A about which the cage assembly 1 rotates. The center point D is used for the arc of the lower edge 64 of the port 39. Point D, therefore, is diametrically opposite the port 39. The importance of this contouring may be realized by observing port 41, which in FIGURE 5 is in its full open position. Here the lower edge of the port substantially coincides with the circumferential surface of the block 2, thereby permitting the entire cross section of the port to be used in taking air into the combustion chamber. Nevertheless, the bottom edge of the port 41 would fall below the periphery of the block 2 with only a slight degree of relative inward travel. Therefore, although the port opens completely, it can begin to close rapidly with but little inward movement.

The forward top edge 65 of the port 39 is struck by an arc having a center point E. This point is rotationally advanced in the clockwise direction from the point D for the lower edge of the port. The point F for the rear top edge portion 66 of the port 39 is spaced from point D in the opposite direction. This positioning permits the top edge 65 to rise abruptly above the periphery of the block 2 when the point of scavenging is reached. It allows the upper leading edge of the port to fall approximately in alignment with surface 42 of the block as the port begins to open. As rotation continues, this edge moves rapidly outward of the block and the port is opened quickly.

Similarly, the top trailing edge 66 drops below the circumferential surface of the block with rapidity when it is time for closing the combustion chamber. The exact center points can be selected so as to establish desired locations of port opening and closing.

The design of this invention is particularly adapted for supercharging, as may be seen in FIGURES 6 and 7. Here the construction is basically the same as described above, with provision added for blowing air into the combustion chambers during scavenging and intake. The support stand 68 is similar to the unit 6 in the previously described embodiment, except for the fact that it is not open to the atmosphere as were the ends of that unit. Instead, blower 69 connects through conduit 70 to an inlet opening 71. While only a single such opening is illustrated, the blower could as well be connected to both ends of the support member 68. The pressurized air from opening 71 enters the interior of the cylinder block 2 and may flow outwardly again through slot 72. This slot is positioned in side plate 73 radially inward of the port 74. The latter aperture may be similar to the ports 38, 39, 40 and 41 in the previously described embodiment. Hence, inward of each of the ports in the supercharged version there is an aperture similar to slot 72. It should be understood that the pressurized air supply connects to all of the ports in a similar manner.

The opening 72 leads to a passageway 75 on the outside of the cage assembly formed by plate 76 and two of the cooling fins 77. This construction, therefore, permits the air from blower 69 to enter the center of the engine, and when the port is open to the combustion chamber, to bypass the rim of the block 2 to enter the combustion chamber. This results in complete scavenging by permitting the air to flow through the combustion chamber and outwardly through port 78. The latter port is directly across from port 74 and contoured similarly to that of port 74. However, port 78 forms the exhaust port for the engine as the exhaust gases are blown from the combustion chamber out through this opening. Hence, while port 78 is open to the exterior of the unit, the exhaust gases may be blown completely from the combustion chamber by the air that enters through openings 72 and 74. Generally it is preferred to position the leading edge of the exhaust port so that it opens slightly ahead of the opening of intake port 74. This is accomplished through appropriate positioning of the center point of the arc that describes the leading edge of this port. Hence, the center point for the upper lead edge of port 78 will be rotationally advanced clockwise a few degrees from the corresponding center point for port 74.

Upon further rotation of the engine and closing of the ports 74 and 78, the operation is the same as before including the compression, ignition and expansion of the gases. The air from blower 69 also serves to cool the interior of the engine providing an effective means to remove the heat of combustion from the block 2 and the vanes 11.

Exhaust from port 78 is directed radially outward by means of a plate 79 that cooperates with another pair of the cooling fins 77 to define an outlet passageway. Centrifugal force can assist in causing the gases to flow outwardly away from the combustion chamber.

In some instances it is preferred to include an exhaust shroud 81 around the periphery of the rotating cage assembly. This shroud is stationary and may be secured to the base 68 by suitable means such as screws 82. The shroud 81 may be formed in two sections, with its radial side walls 83 and 84, as well as its circumferential wall 85, being spaced from the exterior of the cage. A central enlargement 86 is included to provide clearance around the spark plugs 52. The shroud has an outlet opening 87 that communicates tangentially with the interior of this unit (see FIGURE 8).

This construction provides a cooling of the exhaust gases and assists in drawing the gases from the combustion chamber. This arises from the fact that the radial cooling fins 77 give the effect of a centrifugal pump. These rotating fins draw air inwardly through the openings 88 and 89 at the lower edge of the side walls 83 and 84. This air is pumped outwardly by the fins to the periphery 85 and driven out through the opening 87. Hence, the air mingles with the exhaust gases, cooling these gases as they pass into the atmosphere.

During the operation of the engine it is important that a seal be effected between the vanes and the walls of the slots 10 and between the ends 12 of the vanes and the flat surfaces 13 of the cage assembly. Additional seals must be provided between the radial surfaces of the block 2 and the side plates 34 and 35 of the cage. If this is not done, there can be leakage resulting in a loss of compression and escape of the exploded gases without obtaining appropriate useful work from them.

The vanes 11 are sealed with respect to side plates 34 and 35 by the construction best seen in FIGURES 9 and 10. Each vane carries four sealing strips 90 arranged one at each corner of the vane. The vane is suitably notched at its corners to receive these sealing elements which extend lengthwise of the vane. Also, each sealing member 90 may include a series of projections 91 slidably received in substantially complementary recesses 92 formed in the vane. There are four such projections in the embodiment illustrated. A duality of coil springs 93 bears outwardly on each of the sealing elements 90. These springs, therefore, urge the straight outer surfaces 94 of the sealing strip 90 into firm contact with the side plates 34 and 35. The engagement of the flat surface of the seal with the flat surface of the side plate, together with the spring loading of the sealing element assures that appreciable leakage cannot occur.

The seal between the end wall of the vane and the flat surface 13 of the cage is accomplished by three sealing blades 96, 97 and 98 on either side of the end 12 of the vane. These are flat strips of metal received within recesses formed in the end wall 12 of the vane. The sealing blades 96 and 97 are L-shaped having depending sections 99 and 100 at their outer ends. Thus, the sealing blades 96 and 97 extend substantially the width of the vane so that their inner edges 101 and 102 are adjacent and very slightly spaced apart. The third sealing blade 98 is straight and its ends are in juxtaposition with the inner edges of the sealing strips 90. The element 98 is not L-shaped and is received only in the recess in the end wall 12 of the vane. It is an elongated element, however, that passes over the gap existing between the adjacent ends 101 and 102 of the sealing members 96 and 97. These seals also are spring loaded, which urges them into firm contact with the adjacent surfaces 13 of the cage. Here the spring loading may be effected by undulant spring 103 which also is received in the recess in the end wall 12 and located beneath the members 96, 97 and 98. This type of spring provides an even outward force throughout the length of the members 96, 97 and 98 in the end wall of the vane.

The remaining seals are carried by the block 2 and serve to prevent leakage between that member and the side plates, as well as between the block and the vanes in the slots 10. Each quadrant of the block between notches 10 may include elongated recesses 104 and 105. These recesses are arcuate in form adjacent the side walls 34 and 35, and straight where they extend the length of the block at the location of the slots 10. Thus, each of the recesses 104 and 105 provides a continuous four-sided opening circumscribing a section of the block 2. In the embodiment shown, each of the slots 104 and 105 contains four sealing blades, although a greater quantity can be provided if desired. Each of the blades is an L-shaped member, one leg of which is arcuate in one plane and extends adjacent one of the side walls of the cage assembly. The other leg is straight in both planes and passes the length of the block at the location of the slot 10. Hence, as seen in FIGURE 9, two sealing blades 106 and 107 are located within the slot 104. Together they substantially circumscribe the quadrant of the block but leave gaps 108 and 109 at their adjoining ends. Beneath the sealing members 106 and 107 is an additional pair of elements generally similar but oppositely arranged. Thus, seals 110 and 111 are located beneath the members 106 and 107. However, the gaps between the adjoining surfaces of these sealing members are remote from the gaps 108 and 109. In other words, the gaps between the lower pair of sealing members are at the opposite corners of the quadrant of the block. Again, the seals are spring loaded being biased outwardly by means of undulating springs 112, 113, 114 and 115. In this manner, it is possible to seal entirely around the block, while the staggered relationship of the sealing strips assures that no blow-by will be occasioned by the necessary gaps at the adjoining edges of the seals.

It can be seen, therefore, that all of the relatively moving parts of the engine of this invention around the combustion chambers are effectively sealed to preclude loss of pressure. However, these seals are relatively inexpensive members readily installed or replaced if needed. Very little wear is encountered, however, at the flat surfaces of engagement.

From the foregoing it is apparent that we have provided an improved rotary engine of extremely simple yet effective design. The unit is symmetrical and experiences practically no vibration during operation. Many of the parts are interchangeable, and a minimum amount of tooling is required for production of the engine. It is ideally suited for a fuel-injection system and can operate on low grade fuels if necessary. The unique porting arrangement serves all of the needs of the engine, including cooling, without requiring any valves or auxiliary systems.

The foregoing detailed description is to be clearly understood as given by way of illustration and example only, the spirit and scope of this invention being limited solely by the appended claims.

We claim:

1. An internal combustion engine comprising
a first rotor including a housing rotatable about a first axis,
a second rotor within said housing rotatable about a second axis in spaced parallelism with said first axis,
said second rotor having a plurality of guide passageways extending therein from the periphery thereof,
said guide passageways being in opposed pairs, plurality of vanes,
one of said vanes being received in each of said guide passageways and reciprocative relative thereto,
and means interconnecting the vanes in opposed pairs of said guide passageways for maintaining said vanes in a fixed spaced relationship,
said housing having a substantially flat surface adjacent each of said vanes,
said flat surfaces being chordal with respect to an imaginary circle concentric with the axis of rotation of said housing,
said housing including port means for providing ingress and egress for gases to the space between said housing and said second rotor intermediate said vanes,
said port means being in said side walls of said housing,
said second rotor including a circular rim,
said port means being positioned intermediate said vanes,
the radially inner edge of each of said port means being defined by an arc having a radius substantially equal to the radius of said rim,
said radius having a center point substantially on a circle concentric with said first axis,
said circle having a radius substantially equal to the spacing between said axes.

2. A device as recited in claim 1 in which the radially outer edge of each of said port means tapers toward said inner edge of said port means from a central portion spaced away from said inner edge.

3. A device as recited in claim 1 in which said outer edge is defined by a duality of arcs each of which has a radius substantially equal to said radius of said rim, and a center point substantially falling along said circle concentric with said axis of said housing.

4. An internal combustion engine comprising
a support means,
a first rotor mounted on said support means and rotatable relative thereto about a first axis,
said first rotor being substantially cylindrical in shape and having radial side walls and a hollow interior,
a second rotor mounted on said support means and rotatable relative thereto about a second axis of rotation in spaced parallelism with said first axis,
said second rotor having a substantially circular periphery of smaller diameter than the interior of said first rotor,
said second rotor having hollow interior portions and sides in juxtaposition with said sides of said first rotor,
said second rotor having a plurality of radial slots extending the axial length of said second rotor,
a vane in each of said slots and reciprocative therein, said slots and vanes being in opposed pairs,
means fixedly interconnecting the opposed pairs of vanes in the radial direction,
said vanes having outer surfaces engaging adjacent surface portions of said first rotor,
said adjacent surface portions of said first rotor being substantially flat and chordal with respect to a circle concentric with said first axis,
each of said chordal surfaces including a shoulder engageable by the vane during the rotation of said first and second rotors,
said side walls of said first rotor including ports therein,
said ports being positioned intermediate said vanes and equally spaced outwardly from said first axis of rotation,
said ports being exposed radially outward of the periphery of said second rotor in certain rotational positions of said rotors
and inwardly of said periphery in communication with said hollow interior portions in other rotational positions of said rotors,
said support means including aperture means for admitting air into said hollow interior of said second rotor.

5. A device as recited in claim 4 including in addition passage means associated with a side wall of said first rotor for conducting air from said interior to the ports in said side wall for thereby bypassing said periphery of said second rotor when said ports are outward of said periphery.

6. An internal combustion engine comprising
a first rotor including a housing rotatable about a first axis,
a second rotor within said housing rotatable about a second axis in spaced parallelism with said first axis,
said second rotor having a plurality of guide passageways extending therein from the periphery thereof,
said guide passageways being in opposed pairs,
a plurality of vanes,
one of said vanes being received in each of said guide passageways and reciprocative relative thereto,
means interconnecting the vanes in opposed pairs of said guide passageways for maintaining said vanes in a fixed spaced relationship,
said housing having a substantially flat surface adjacent each of said vanes,
said flat surfaces being chordal with respect to an imaginary circle concentric with the axis of rotation of said housing,
said housing including port means for providing ingress and egress for gases to the space between said housing and said second rotor intermediate said vanes,
said second rotor including a peripheral rim,
and a hollow interior portion inwardly of said rim,
said first rotor including substantially radially inwardly extending side walls,
said port means being defined by apertures through said side walls,
said apertures being positioned such that in certain relative rotational positions of said first and said second rotors each of said apertures is radially beyond said rim,
and in other such positions each of said apertures is radially inward of said rim,
each of said vanes including a passage therethrough providing communication between said hollow interior and said space between said housing and said second rotor in one relative rotational position of said rotors for providing a cooling flow of air through said vane,
said passageway being closed by said rim in other such relative rotational positions,
and means for conducting air to said interior of said second rotor inwardly of said rim.

7. An internal combustion engine comprising
a first rotor including a housing rotatable about a first axis,
a second rotor within said housing rotatable about a second axis in spaced parallelism with said first axis,
said second rotor having a plurality of guide passageways extending therein from the periphery thereof,
said guide passageways being in opposed pairs,
a plurality of vanes,
one of said vanes being received in each of said guide passageways and reciprocative relative thereto,
means interconnecting the vanes in opposed pairs of said guide passageways for maintaining said vanes in a fixed spaced relationship,
said housing having a substantially flat surface adjacent each of said vanes,
said flat surfaces being chordal with respect to an imaginary circle concentric with the axis of rotation of said housing,
said housing including port means for providing ingress and egress for gases to the space between said housing and said second rotor intermediate said vanes,
said second rotor including a peripheral rim,
and a hollow interior portion inwardly of said rim,
said first rotor including substantially radially inwardly extending side walls,
said port means being defined by apertures through said side walls,
said apertures being positioned such that in certain relative rotational positions of said first and said second rotors each of said apertures is radially beyond said rim,
and in other such positions each of said apertures is radially inward of said rim,
means for conducting air to said interior of said second rotor inwardly of said rim,
one of said side walls including a slot therein radially inward of each of the ports therethrough and positioned radially inward of said rim in all relative rotational positions of said rotors, and a passage interconnecting said slot and the radially adjacent port for providing communication between said interior of said second rotor and said port.

References Cited by the Examiner

UNITED STATES PATENTS

| | | | |
|---|---|---|---|
| 851,962 | 4/1907 | Prossen | 123—8 |
| 1,116,471 | 11/1914 | Neumeyer | 123—8 |
| 1,504,926 | 8/1924 | Baisch | 123—8 |
| 1,594,035 | 7/1926 | Bailey | 123—8 |
| 1,670,953 | 5/1928 | Browne | 123—8 |
| 2,680,348 | 6/1954 | Wahlmark | 103—121 |

FOREIGN PATENTS

| | | |
|---|---|---|
| 1,191,555 | 4/1959 | France. |
| 327,119 | 3/1930 | Great Britain. |

MARK NEWMAN, *Primary Examiner.*

F. T. SADLER, *Assistant Examiner.*